(12) United States Patent
Takano et al.

(10) Patent No.: US 10,444,442 B2
(45) Date of Patent: Oct. 15, 2019

(54) MPO OPTICAL FIBER CONNECTOR

(71) Applicant: SENKO Advanced Components, Inc., Marlborough, MA (US)

(72) Inventors: Kazuyoshi Takano, Southborough, MA (US); Man Ming Ho, Hong Kong (HK); Siu Kei Ma, Hong Kong (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/802,693

(22) Filed: Nov. 3, 2017

(65) Prior Publication Data

US 2019/0137700 A1    May 9, 2019

(51) Int. Cl.
G02B 6/38    (2006.01)

(52) U.S. Cl.
CPC ......... *G02B 6/3887* (2013.01); *G02B 6/3857* (2013.01); *G02B 6/3893* (2013.01); *G02B 6/3825* (2013.01); *G02B 6/3831* (2013.01)

(58) Field of Classification Search
None
See application file for complete search history.

(56) References Cited

U.S. PATENT DOCUMENTS

| | | |
|---|---|---|
| 4,150,790 A | 4/1979 | Potter |
| 4,327,964 A | 5/1982 | Haesly et al. |
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,844,570 A | 7/1989 | Tanabe |
| 4,872,736 A | 10/1989 | Myers et al. |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

ARK Communication Co., Ltd., SC/LC/FC/ST/MU/D4/DIN Fiber Optic Connectors, Oct. 21, 2014, Shenzhen, China, https://web.archive.org/web/20141021222819/http://www.ark-opitical.com/product-1-1-optic-fiber-connector-en/14296.

*Primary Examiner* — Tina M Wong
(74) *Attorney, Agent, or Firm* — Edward S. Jarmolowicz, Esq.

(57) ABSTRACT

A multiple push-on (MPO) optical connector is provided having a ferrule configured to house multiple optical fibers and a housing having a distal end in a connection direction configured to hold the ferrule. The housing further includes a pair of proximal apertures and at least one proximal groove. A backpost has a distal end that urges the ferrule toward the distal end of the housing and a proximal end configured to receive a crimp ring. The backpost includes a pair of proximally extending latch arms that reverse latch in the proximal apertures of the housing. To strengthen the connector in side-loading environments, the backpost further includes a reinforcing rib that is received in the housing proximal groove. In a further aspect, the proximal end of the backpost may include a neck with an approximately curved side profile that, following crimping with a stepped crimp ring, results in an angled crimp.

20 Claims, 12 Drawing Sheets

(56) References Cited

U.S. PATENT DOCUMENTS

| | | |
|---|---|---|
| 4,979,792 A | 12/1990 | Weber et al. |
| 5,041,025 A | 8/1991 | Haitmanek |
| 5,074,637 A | 12/1991 | Rink |
| D323,143 S | 1/1992 | Ohkura et al. |
| 5,212,752 A | 5/1993 | Stephenson et al. |
| 5,265,181 A | 11/1993 | Chang |
| 5,280,552 A | 1/1994 | Yokoi et al. |
| 5,289,554 A | 2/1994 | Cubukclyan et al. |
| 5,317,663 A | 5/1994 | Beard et al. |
| 5,335,301 A | 8/1994 | Newman et al. |
| 5,348,487 A | 9/1994 | Marazzi et al. |
| 5,444,806 A | 8/1995 | de Marchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,915,056 A | 6/1999 | Bradley et al. |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| 6,186,670 B1 | 2/2001 | Austin et al. |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,347,888 B1 | 2/2002 | Puetz |
| 6,461,054 B1 | 10/2002 | Iwase |
| 6,471,412 B1 | 10/2002 | Belenkiy |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,785,460 B2 | 8/2004 | de Jong et al. |
| 6,817,780 B2 | 11/2004 | Ngo |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,020,376 B1 | 3/2006 | Dang et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,241,056 B1 | 7/2007 | Kuffel et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| D572,661 S | 6/2008 | En Lin et al. |
| 7,387,447 B2 | 6/2008 | Mudd et al. |
| 7,390,203 B2 | 6/2008 | Murano et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,654,748 B2 | 2/2010 | Kuffel et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,224,146 B2 | 7/2012 | Hackett |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,556,520 B2 | 10/2013 | Elenbaas et al. |
| 8,636,424 B2 | 1/2014 | Kuffel et al. |
| 8,636,425 B2 | 1/2014 | Nhep |
| 8,651,749 B2 | 2/2014 | Júnior et al. |
| 8,770,863 B2 | 7/2014 | Cooke et al. |
| 8,855,458 B2 | 10/2014 | Belenkiy et al. |
| 9,239,437 B2 | 1/2016 | Belenkiy et al. |
| 9,383,539 B2 * | 7/2016 | Hill ............... B01D 53/62 |
| 9,618,702 B2 | 4/2017 | Takano et al. |
| 9,618,703 B2 | 4/2017 | Iizumi et al. |
| 9,658,409 B2 | 5/2017 | Gniadek et al. |
| 9,772,457 B2 * | 9/2017 | Hill ............... G02B 6/3885 |
| 9,778,090 B2 * | 10/2017 | Hirt ............... G01F 23/292 |
| 9,778,425 B2 | 10/2017 | Nguyen et al. |
| 9,798,090 B2 * | 10/2017 | Takano ............ G02B 6/3825 |
| 9,798,094 B2 | 10/2017 | Kuffel et al. |
| 9,897,766 B2 | 2/2018 | Gniadek et al. |
| 9,933,582 B1 * | 4/2018 | Lin ............... G02B 6/3821 |
| 9,939,589 B2 | 4/2018 | Takano et al. |
| 9,977,199 B2 | 5/2018 | Chang et al. |
| 2001/0010741 A1 | 8/2001 | Hizuka |
| 2003/0007739 A1 | 1/2003 | Perry et al. |
| 2003/0053787 A1 | 3/2003 | Lee |
| 2003/0063867 A1 | 4/2003 | McDonald et al. |
| 2013/0121653 A1 | 5/2003 | Shitama et al. |
| 2003/0147598 A1 | 8/2003 | McPhee et al. |
| 2003/0156796 A1* | 8/2003 | Rathnam ........... G02B 6/3825 385/55 |
| 2003/0161586 A1 | 8/2003 | Hirabayashi |
| 2004/0047566 A1 | 3/2004 | McDonald et al. |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2004/0264873 A1 | 12/2004 | Smith et al. |
| 2005/0111796 A1 | 5/2005 | Matasek et al. |
| 2005/0141817 A1 | 6/2005 | Yazaki et al. |
| 2005/0213897 A1 | 9/2005 | Palmer et al. |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0026647 A1 | 1/2008 | Boehnlein et al. |

(56) References Cited

U.S. PATENT DOCUMENTS

| | | |
|---|---|---|
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | En Lin |
| 2009/0022457 A1 | 1/2009 | de Jong et al. |
| 2009/0028507 A1 | 1/2009 | Jones et al. |
| 2009/0148101 A1 | 6/2009 | Lu et al. |
| 2009/0196555 A1 | 8/2009 | Lin et al. |
| 2009/0214162 A1 | 8/2009 | O'Riorden et al. |
| 2009/0220197 A1 | 9/2009 | Gniadek et al. |
| 2009/0226140 A1 | 9/2009 | Belenkiy et al. |
| 2009/0269014 A1 | 10/2009 | Winberg et al. |
| 2010/0034502 A1 | 2/2010 | Lu et al. |
| 2010/0092136 A1 | 4/2010 | Nhep |
| 2010/0129031 A1* | 5/2010 | Danley ............... G02B 6/3818 385/59 |
| 2010/0215322 A1 | 8/2010 | Matsumoto et al. |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0081119 A1* | 4/2011 | Togami ............... G02B 6/3885 385/89 |
| 2011/0131801 A1 | 6/2011 | Nelson et al. |
| 2011/0177710 A1 | 7/2011 | Tobey |
| 2012/0099822 A1 | 4/2012 | Kuffel et al. |
| 2012/0128305 A1* | 5/2012 | Cooke ............... G02B 6/3887 385/78 |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0183012 A1 | 7/2013 | Lopez et al. |
| 2013/0216185 A1* | 8/2013 | Klavuhn ............... G02B 6/3882 385/60 |
| 2013/0322825 A1 | 12/2013 | Cooke et al. |
| 2014/0016901 A1 | 1/2014 | Lambourn et al. |
| 2014/0023322 A1 | 1/2014 | Gniadek |
| 2014/0050446 A1 | 2/2014 | Chang |
| 2014/0133808 A1 | 5/2014 | Hill et al. |
| 2014/0334780 A1 | 11/2014 | Nguyen et al. |
| 2014/0348477 A1 | 11/2014 | Chang |
| 2015/0023646 A1 | 1/2015 | Belenkiy et al. |
| 2015/0078717 A1 | 3/2015 | Lin |
| 2015/0177467 A1 | 6/2015 | Gniadek et al. |
| 2015/0241642 A1* | 8/2015 | Hikosaka ............... G02B 6/3887 385/72 |
| 2015/0355417 A1 | 12/2015 | Takano et al. |
| 2015/0378113 A1 | 12/2015 | Good et al. |
| 2016/0041349 A1* | 2/2016 | Pimpinella ........... G02B 6/3893 385/77 |
| 2016/0259135 A1 | 9/2016 | Gniadek et al. |
| 2017/0091671 A1* | 3/2017 | Mitarai ............. G06F 17/30598 |
| 2017/0254966 A1 | 9/2017 | Gniadek et al. |
| 2018/0011261 A1* | 1/2018 | Hill ...................... G02B 6/3885 |
| 2019/0137700 A1* | 5/2019 | Takano ................ G02B 6/3887 |

FOREIGN PATENT DOCUMENTS

| | | |
|---|---|---|
| CN | 201383588 Y | 1/2010 |
| DE | 19901473 A1 | 7/2000 |
| DE | 202006011910 U1 | 4/2007 |
| DE | 102006019335 A1 | 10/2007 |
| EP | 1072915 A2 | 1/2001 |
| EP | 1074868 A1 | 2/2001 |
| EP | 1211537 A2 | 6/2002 |
| EP | 1245980 A2 | 10/2002 |
| EP | 1566674 A1 | 8/2005 |
| GB | 3B2111240 | 6/1983 |
| JP | 2009229545 A | 10/2009 |
| JP | 2009276493 A | 11/2009 |
| TW | 200821653 A | 5/2008 |
| WO | WO2001079904 A2 | 10/2001 |
| WO | WO2004027485 A1 | 4/2004 |
| WO | WO2008112986 A1 | 9/2008 |
| WO | WO2009135787 A1 | 11/2009 |
| WO | WO2010024851 A2 | 3/2010 |
| WO | WO2012136702 A1 | 10/2012 |
| WO | WO2012162385 A1 | 11/2012 |
| WO | WO2013052070 A1 | 4/2013 |
| WO | WO2013179197 | 12/2013 |
| WO | WO2014028527 A2 | 2/2014 |
| WO | WO2014182351 A1 | 11/2014 |

* cited by examiner

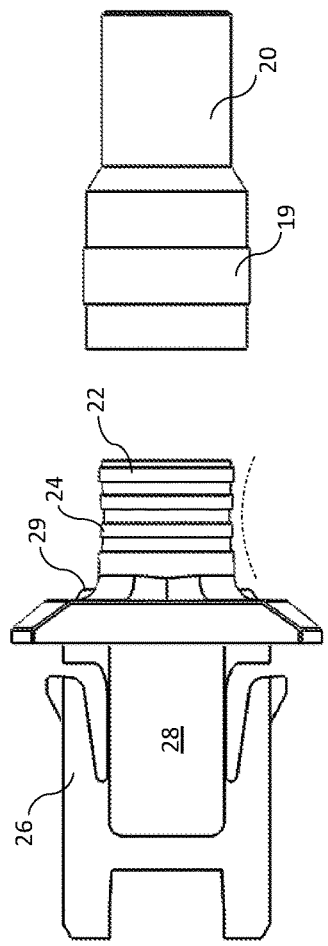
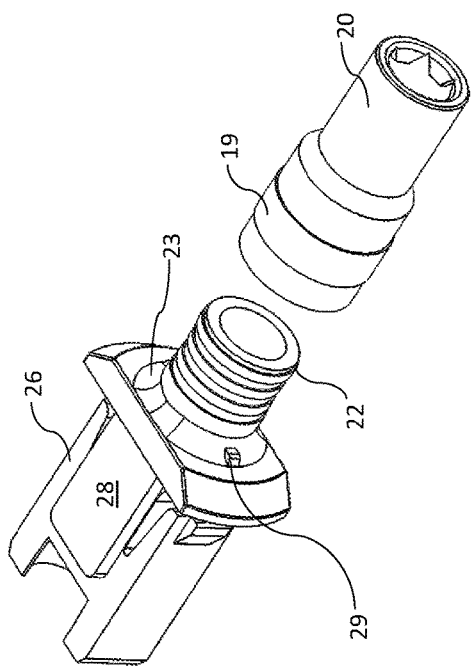
FIG. 3A
FIG. 3B

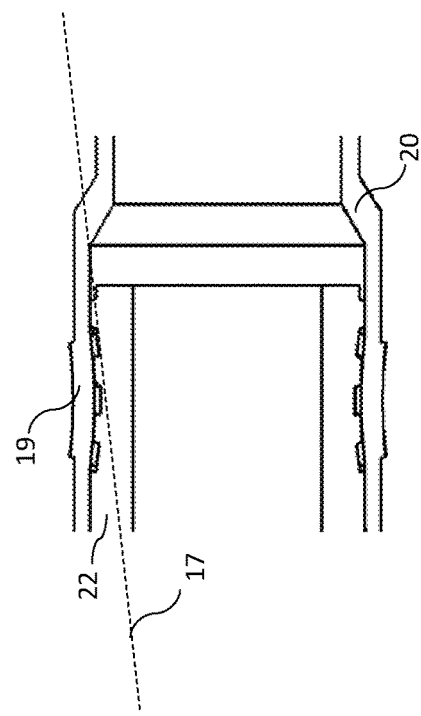
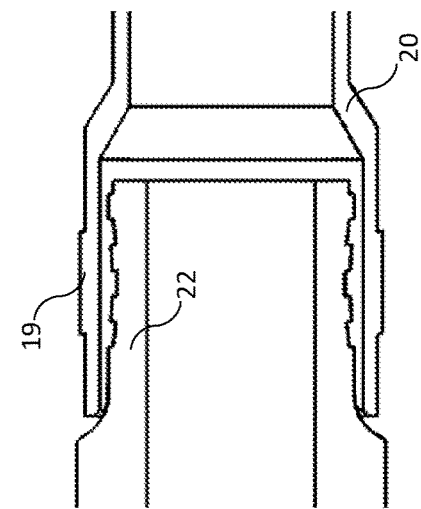
FIG. 4B
FIG. 4A

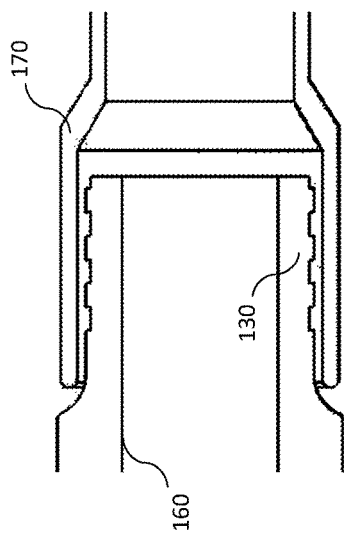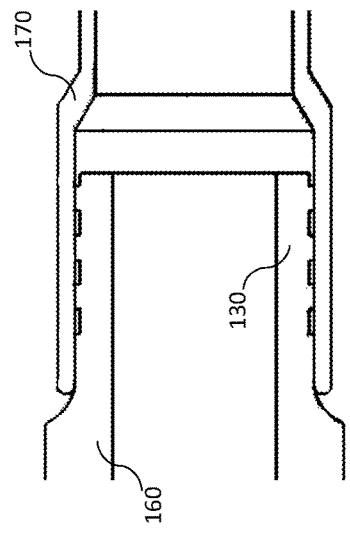
FIG. 7A PRIOR ART
FIG. 7B PRIOR ART

MPO OPTICAL FIBER CONNECTOR

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds.

Individual optical fibers are extremely small. For example, even with protective coatings, optical fibers may be only about 250 microns in diameter (only about 4 times the diameter of a human hair). As such, hundreds of fibers can be installed in cables that will take up relatively little space. For connections between cables, however, the fibers are terminated with connectors. Multiple fibers may be arranged within a single connector. For example, multi-fiber connectors such as those using multi-fiber push-on/pull-off (MPO) technology may contain and connect 12 or 24 fibers. Connectors, such as MPO type connectors, generally include a housing portion that contains a ferrule that terminates the ends of the fibers. Ferrules are generally used to retain the ends of the optical fibers for connecting the optical fibers. One type of optical ferrule that may be used with MPO type connectors is an MT (Mechanically Transferable) ferrule.

Typically, MPO connectors are joined together to connect the optical transmission path of one fiber optic cable to another fiber optic cable or device, and the connection may be made by inserting the MPO connectors in an MPO adapter. An adapter generally includes a housing, or portion of a housing, having at least one port which is configured to receive and hold a connector to facilitate the optical connection of the connector ferrule with the ferrule of another connector or other device. Adapters may be used to facilitate connections contained within a chassis. The term "chassis" as used herein broadly refers to a containment structure for housing electrical components or switching components.

When connected to a chassis, optical connectors may be subject to significant side loads as the optical cables attached to the connectors may hang downward, pulling sideways on the optical connector. There is a need in the art for MPO connectors having improved strength in side loading environments.

SUMMARY

In one aspect, the present invention relates to a multiple fiber push-on (MPO) optical connector having a ferrule configured to house multiple optical fibers and a housing having a distal end in a connection direction and a proximal end in a cable direction that is configured to hold the ferrule. The housing further includes a pair of proximal apertures and at least one proximal groove. A backpost has a distal end that urges the ferrule toward the distal end of the housing and a proximal end configured to receive a crimp ring. The backpost includes a pair of proximally extending latch arms configured to reverse latch in the proximal apertures of the housing. To strengthen the connector in side-loading environments, the backpost further includes a reinforcing rib configured to be received in the housing proximal groove. In a further aspect, the proximal end of the backpost may include a neck having an approximately curved side profile that, following crimping with a stepped crimp ring, results in an angled crimp that increases the pull-out strength of the connection. Protrusions extending from the backpost may be provided to prevent the crimp ring from extending too far distally, ensuring proper positioning of the crimp ring.

BRIEF DESCRIPTION OF THE DRAWINGS

FIG. 2A is an exploded perspective view, FIG. 2B is a side view, FIG. 2C is a perspective view looking into the housing, and FIG. 2D is a cross-sectional view of an assembled backpost and housing.

FIGS. 3A, 3B, 3C depict a backpost and a crimp ring for use in the MPO connector of FIGS. 1A and 1B. FIG. 3A is a side view, FIG. 3B is a perspective view with parts separated, and FIG. 3C is a side view assembled of the backpost of crimp ring.

FIGS. 4A and 4B are cross-sectional views of a backpost and crimp ring before and after crimping.

FIG. 7A depicts the neck of a prior art back post received in a crimp ring prior to the crimp ring being crimped onto the neck; and FIG. 7B depicts the crimp ring and neck of FIG. 7A after the crimp ring has been crimped onto the neck.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. While the following description is directed towards MPO adapters and MPO connectors with MT optical ferrules, the embodiments described may be applicable to other connectors and ferrule types as well. In the description below, the distal direction is toward the connection of the optical fiber while the proximal direction is toward the cable end on the connector.

Figure 1A:
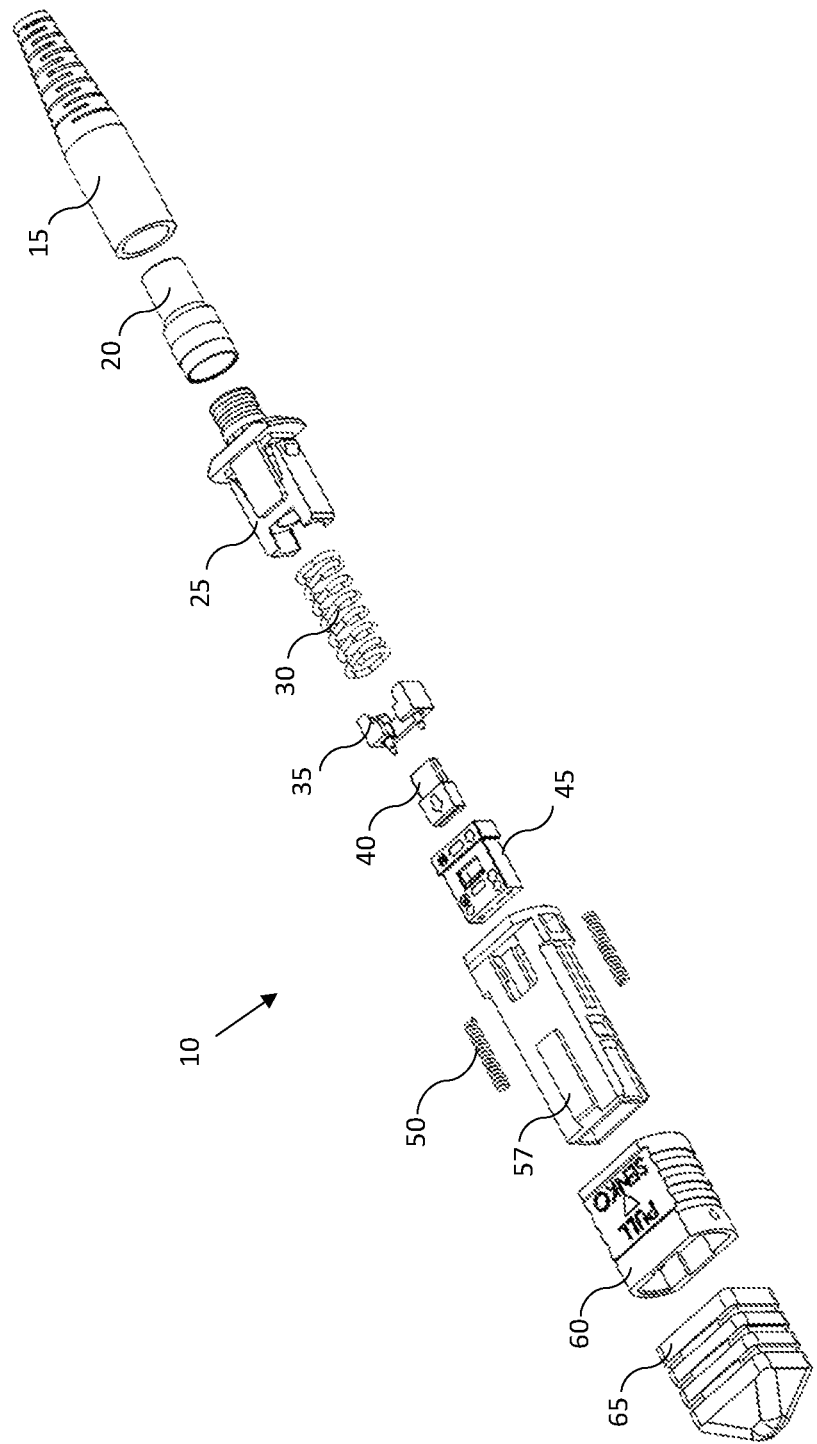
FIGS. 1A and 1B depict an exploded perspective view and an assembled perspective view, respectively, of an MPO optical connector according to an embodiment.
Figure 1B:
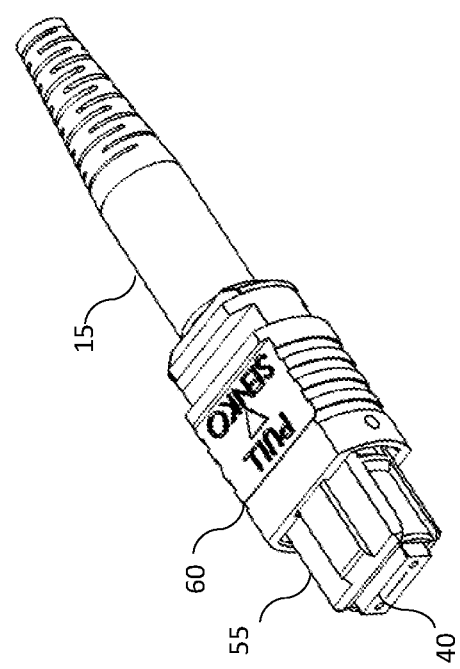

For connection of multiple fiber optic cables together or with other devices, the terminal end of a cable may include the MPO connector 10 as represented in FIGS. 1A and 1B. A connector 10 may include a housing 55 configured to hold a ferrule 45 that may be a multiple-fiber ferrule, urged towards a distal (connection) end of the housing by biasing member 30 and backpost 25. In use, a fiber optic cable is attached to the proximal end of connector 10, extending from cable boot 15.

The connector 10 may include a displaceable outer housing member 60 that may be slidably disposed about the housing 55 adjacent the distal end of the connector 10. To provide for a pre-determined alignment of fiber optic cables within an adapter or other connection, the housing 55 may include an alignment key 57 that is configured to fit within a keying slot of an adapter. The outer housing 60 may also slide along alignment key 57. The outer housing 60 may be biased towards the distal end of the connector via springs 50 or alternative types of biasing devices. An optional dust cap 65 fits over the distal end of connector 10 to protect the ferrule and the optical fibers contained therein when the connector is not connected to a mating connector or other device.

The optical connector 10 further includes a pin retainer 35 having a pair of pins that extend into the ferrule 45. Depending on whether the connector is configured as a male, female, or reconfigurable connector, guide pins may extend through the ferrule or the ferrule will have receiving apertures to accommodate guide pins from a mating connector. The biasing member 30, depicted in this embodiment as a spring, may be disposed between the backpost 25 and the pin retainer 35 to bias the ferrule 45 distally within the housing 55. Such biasing provides a biased mating of ferrule ends when the connector 10 is mated in an adapter or other connection to thereby hold the mated ferrule ends in contact with one another. An optional ferrule boot 40 is provided for fiber organization as the fibers extend into ferrule 45.

A fiber optic cable may be retained with the back post 25 by means of a crimp ring 20, or other type of detainment connector. A connector such as ring 20 may be crimped to the back post as well as to a cable sheathing (e.g., aramid fiber sheathing) of the cable to thereby prevent the cable from being pulled away from the backpost 25. The boot 15 is positioned over the crimped connection, providing support to an optical cable extending therethrough. The boot may be shaped to include an angle for connectors that will be subject to side loading to orient the cable 90 degrees from the connection direction.

Figure 2A:
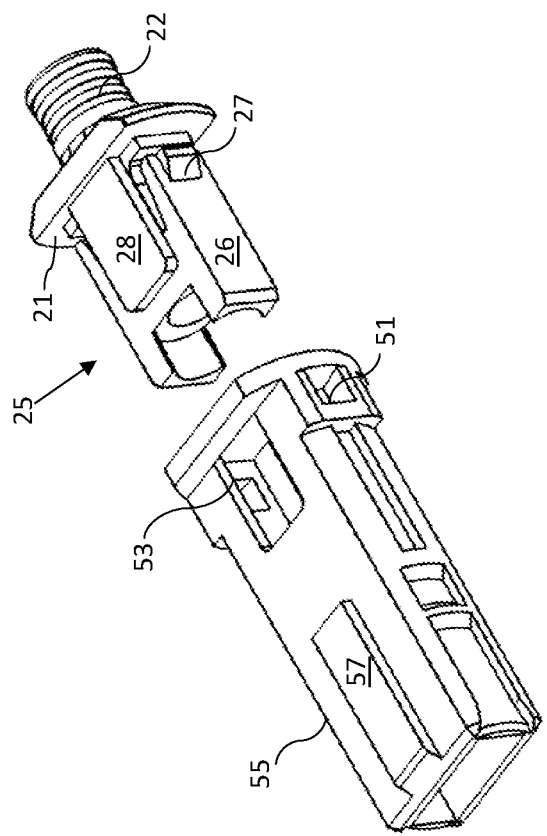
FIGS. 2A, 2B, 2C, and 2D depict a backpost and housing combination for use in the MPO optical connector of FIGS. 1A and 1B.
Figure 2B:
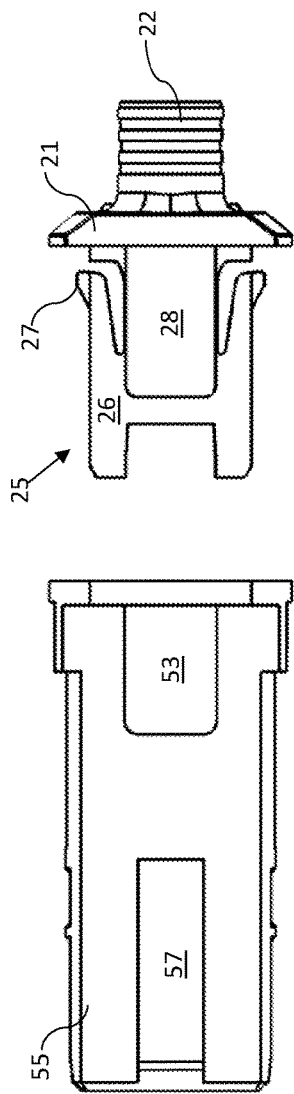
Figure 2C:
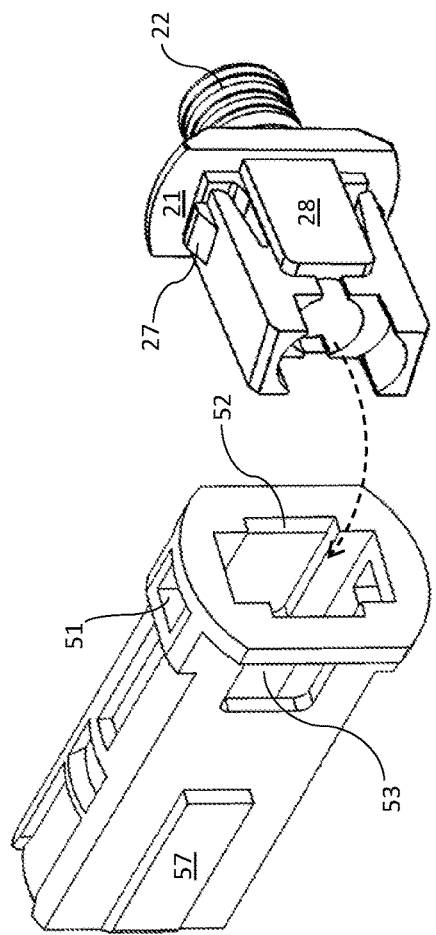
Figure 2D:
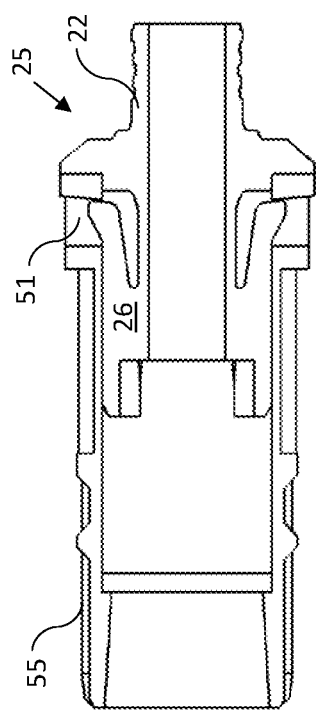
Figure 6:
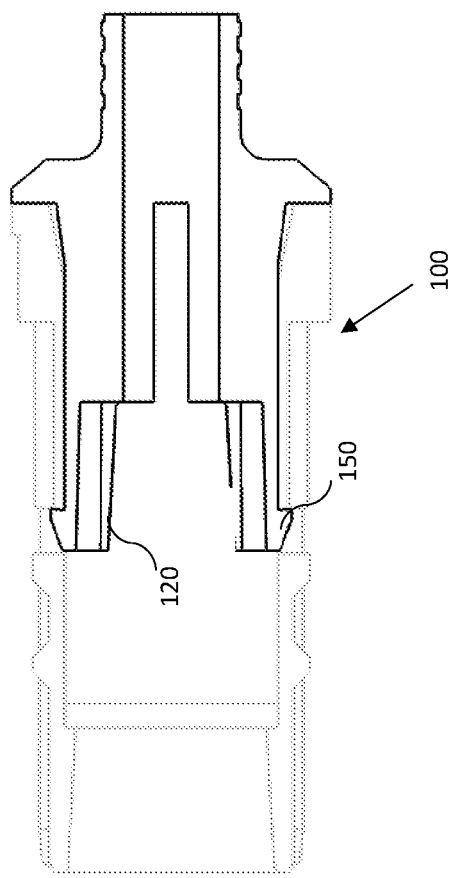
FIG. 6 depicts a prior art connector comprising a conventional backpost.

More detailed views of the housing 55 and the backpost 25 are represented in FIGS. 2A, 2B, 2C, and 2D. As seen in FIG. 2A, the backpost 25 includes a flange 21 that connects to a ridged neck 22 through a fillet 23. Ridges 24 assist in retaining the aramid fiber sheathing of the optical cable on the neck 22. A pair of proximally-extending latch arms 26 include latch projections 27 for mating in proximal apertures 51 of the housing 55. Through the use of proximally-extending latch arms 26, the connector becomes a "reverse-latch" connector in that the connector latches adjacent to flange 21. In contrast to the inventive reverse-latch backpost 25, a conventional connector 100 with a conventional backpost 150 is depicted in FIG. 6. As seen in FIG. 6, the conventional backpost includes a pair distally-extending hooked legs 120. In particular, stress is concentrated at leg tip 150 which may break more easily in a side-loading condition. The shape of the proximally-extending latch arms and the latch projections spreads stress from an applied load, particularly a side load, throughout the entire arm, increasing the force that the optical connector is able to withstand. Further, the force exerted on the latching arms is changed from a shear stress to a compressive stress; as materials typically can withstand a greater compressive stress than shear stress, this enhances the overall strength of the connector. It is understood that the expression "reverse latch" is the opposite latch direction, that is, proximally-extending latch arms, to the conventional distally-extending latch arms depicted in FIG. 6.

To further increase the load capacity of the connector, one or more strengthening ribs 28 are positioned between the latching arms 26 on the backpost 25. The strengthening rib(s) is/are inserted into one or more corresponding grooves 52 within the housing 55, best seen in FIG. 2C. Optionally, one or more windows 53 are positioned approximately coextensive with the ribs 28 when the backpost is seated with the housing 55, FIG. 2D. Consequently, the window is also substantially coextensive with groove 52 that accommodates the rib 28. Alternatively, the housing may include grooves 52 enclosed within the housing 55, without windows. The strengthening ribs 28 increase the side load capacity of the connector. Further increasing the side load capacity is the window 53 which provides additional support to the strengthening rib 28 when the rib is seated within the window.

Figure 3C:
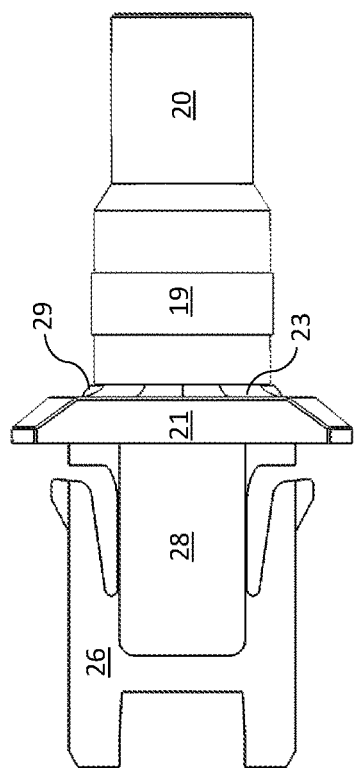

Another way to increase the strength of the optical connector is to increase the pull-out strength of the connection between the optical fiber cable and the backpost. As seen in FIGS. 3A, 3B, and 3C, several features ensure the proper positioning of an optical fiber cable on the backpost and ensure proper positioning of a crimp ring and enhanced crimp strength to increase the pull-out strength. As discussed above, ridges 24 on backpost neck 22 assist in retaining the aramid fiber sheathing of the optical cable. The neck 22 has a curved profile, in an approximately concave shape, as seen by the curved dashed line in FIG. 3A. The curved profile provides additional area in which to accommodate the aramid fiber between the neck and the crimp ring 20 and, as discussed below, results in an angled crimp as seen by the dashed line 17 with increased pull-out strength. Interacting with the curved-profile neck 22 is stepped crimp ring 20, which includes stepped region 19. During crimping, the greater height of stepped region 19 makes it the first area to be deformed; it will consequently undergo a greater deformation, ensuring a stronger hold on the aramid fiber from an optical cable being terminated by connector 10. In contrast, FIGS. 7A and 7B show a conventional crimp on a conventional backpost 160 with a straight-profile neck 130. During crimping, the deformation of the crimp ring 170 is uniform, resulting in a straight-line crimp profile as seen in FIG. 7B.

To ensure that the crimp ring is not positioned too far distally on the backpost 25, stopping protrusions 29 are provided on fillet 23, preventing the crimp ring from damaging the backpost fillet 23. As seen in FIG. 3C, a properly-positioned crimp ring 20 covers the entire neck region 22 with protrusions 29 preventing the crimp ring from being pushed too far forward on the fillet 23 that leads into flange 21 of backpost 25.

FIGS. 4A and 4B depict the stepped crimp ring 20 on curved-profile neck 22 before crimping, FIG. 4A, and after crimping, FIG. 4B. Before crimping, raised step 19 is clearly visible; after crimping, as seen in FIG. 4B, it is substantially flattened by the crimping force, creating an angled crimp line 17 caused by the curved neck 22 and the crimp ring 20. This angled crimp resists pull-out of an optical fiber cable.

Figure 5A:
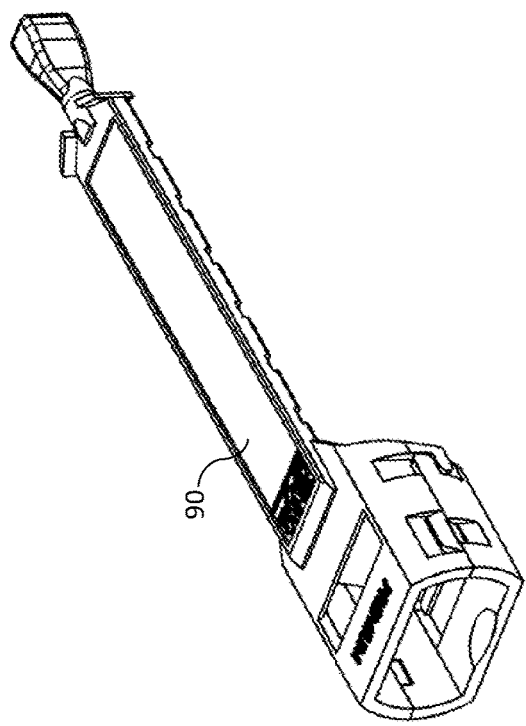
FIGS. 5A and 5B depict a pull-tab (FIG. 5A) and a pull-tab assembled on an MPO connector (FIG. 5B).
Figure 5B:
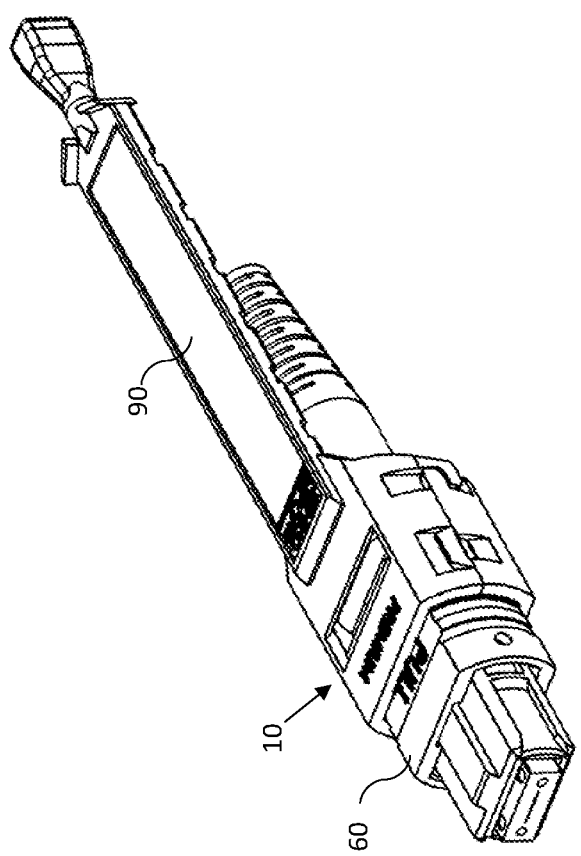

Various accessories may be added to the basic optical connector such as the pull tab 90 of FIGS. 5A and 5B. In various applications, such as optical back planes, connectors are densely clustered at a chassis, making it difficult to insert or remove an individual connector 10. Pull tab 90 includes two sections that snap fit over outer housing 60, permitting a user to remotely slide outer housing 60 in a proximal direction to remove the connector 10.

Various parts, components or configurations described with respect to any one embodiment above may also be adapted to any others of the embodiments provided. This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A multiple fiber push-on (MPO) optical connector having a longitudinal axis, the connector comprising:
    a ferrule configured to house multiple optical fibers;
    a housing having a distal end in a connection direction and a proximal end in a cable direction and configured to hold the ferrule, the proximal end of the housing being spaced apart proximally of the distal end of the housing along the longitudinal axis of the connector, the housing further including a pair of proximal apertures;
    a backpost having a distal end urging the ferrule toward the distal end of the housing and a proximal end configured to receive a crimp ring, the proximal end of the backpost being spaced apart proximally of the distal end of the backpost along the longitudinal axis of the connector, the backpost including a pair of proximally extending latch arms configured to reverse latch in the proximal apertures of the housing, wherein each latch arm has a length extending from a first end portion that is connected to the backpost to a free second end portion, the free second end portion of each latch arm being located proximally of the first end portion along the longitudinal axis of the connector.

2. The multiple fiber push-on (MPO) optical connector as recited in claim 1, further including protrusions on the backpost.

3. The multiple fiber push-on (MPO) optical connector as recited in claim 1, wherein the backpost includes a proximally-extending neck, a flange, and a fillet extending between the neck and the flange.

4. The multiple fiber push-on (MPO) optical connector as recited in claim 3 further comprising protrusions extending from the fillet to prevent the crimp ring from damaging the fillet during crimping.

5. The multiple fiber push-on (MPO) optical connector as recited in claim 1, wherein the crimp ring includes a stepped region for receiving the initial crimping force.

6. The multiple fiber push-on (MPO) optical connector as recited in claim 5, wherein the backpost includes a proximally-extending neck having a curved side profile.

7. The multiple fiber push-on (MPO) optical connector as recited in claim 6, wherein the curved side profile of the neck and the crimp ring form an angled crimp line.

8. The multiple fiber push-on (MPO) optical connector as recited in claim 1, further comprising an outer housing slidably positioned over the housing.

9. The multiple fiber push-on (MPO) optical connector as recited in claim 8 further comprising resilient biasing members positioned between the outer housing and the housing to distally bias the outer housing.

10. The multiple fiber push-on (MPO) optical connector as recited in claim 8, further comprising a removable pull tab positioned over the outer housing.

11. The multiple fiber push-on (MPO) optical connector as recited in claim 1, further comprising a boot positioned over the crimp ring.

12. The multiple fiber push-on (MPO) optical connector as recited in claim 1, further comprising a window in the housing approximately coextensive with the housing proximal groove to accommodate the rib.

13. A reverse latch multiple fiber push-on (MPO) optical connector having a longitudinal axis, the connector comprising:
    a ferrule configured to house multiple optical fibers;
    a housing having a distal end in a connection direction and a proximal end in a cable direction and configured to hold the ferrule, the proximal end of the housing being spaced apart proximally of the distal end of the housing along the longitudinal axis of the connector, the housing further including a pair of proximal apertures;

a backpost having a distal end urging the ferrule toward the distal end of the housing and a proximal end configured to receive a crimp ring, the proximal end of the backpost being spaced apart proximally of the distal end of the backpost along the longitudinal axis of the connector, the backpost including a pair of proximally-extending latch arms configured to reverse latch in the proximal apertures of the housing, wherein each latch arm has a length extending from a first end portion that is connected to the backpost to a free second end portion, the free second end portion of each latch arm being located proximally of the first end portion along the longitudinal axis of the connector.

14. The multiple fiber push-on (MPO) optical connector as recited in claim 13, wherein the crimp ring includes a stepped region for receiving the initial crimping force.

15. The multiple fiber push-on (MPO) optical connector as recited in claim 14, wherein the backpost includes a proximally-extending neck having a curved side profile.

16. The multiple fiber push-on (MPO) optical connector as recited in claim 15, wherein the curved side profile of the neck and the crimp ring form an angled crimp line.

17. In a multiple fiber push-on (MPO) optical connector having a longitudinal axis, a ferrule configured to house multiple optical fibers, a housing having a distal end in a connection direction and a proximal end in a cable direction and configured to hold the ferrule, a backpost having a distal end urging the ferrule toward the distal end of the housing and a proximal end configured to receive a crimp ring, the improvement comprising a proximally-extending neck from the backpost having a curved side profile for forming a skewed crimp line with a stepped crimp ring, wherein the skewed crimp line is oriented at a skew angle with respect to the longitudinal axis.

18. A multiple fiber push-on (MPO) optical connector having a longitudinal axis, the connector comprising:

a ferrule configured to house multiple optical fibers;

a housing having a distal end in a connection direction and a proximal end in a cable direction and configured to hold the ferrule, the proximal end of the housing being spaced apart proximally of the distal end of the housing along the longitudinal axis of the connector, the housing further including a pair of proximal apertures and at least one proximal groove;

a backpost having a distal end urging the ferrule toward the distal end of the housing and a proximal end configured to receive a crimp ring, the proximal end of the backpost being spaced apart proximally of the distal end of the backpost along the longitudinal axis of the connector, the backpost further comprising a reinforcing rib configured to be received in the housing proximal groove, the backpost including a pair of proximally-extending latch arms configured to reverse latch in the proximal apertures of the housing, wherein each latch arm has a length extending from a first end portion that is connected to the backpost to a free second end portion, the free second end portion of each latch arm being located proximally of the first end portion along the longitudinal axis of the connector.

19. The multiple fiber push-on (MPO) optical connector as recited in claim 18, further including protrusions on the backpost.

20. The multiple fiber push-on (MPO) optical connector as recited in claim 18, wherein the backpost includes a proximally-extending neck, a flange, and a fillet extending between the neck and the flange.

* * * * *